(No Model.)
C. H. BIDWELL.
BEAN THRASHING MACHINE.
No. 402,893. Patented May 7, 1889.
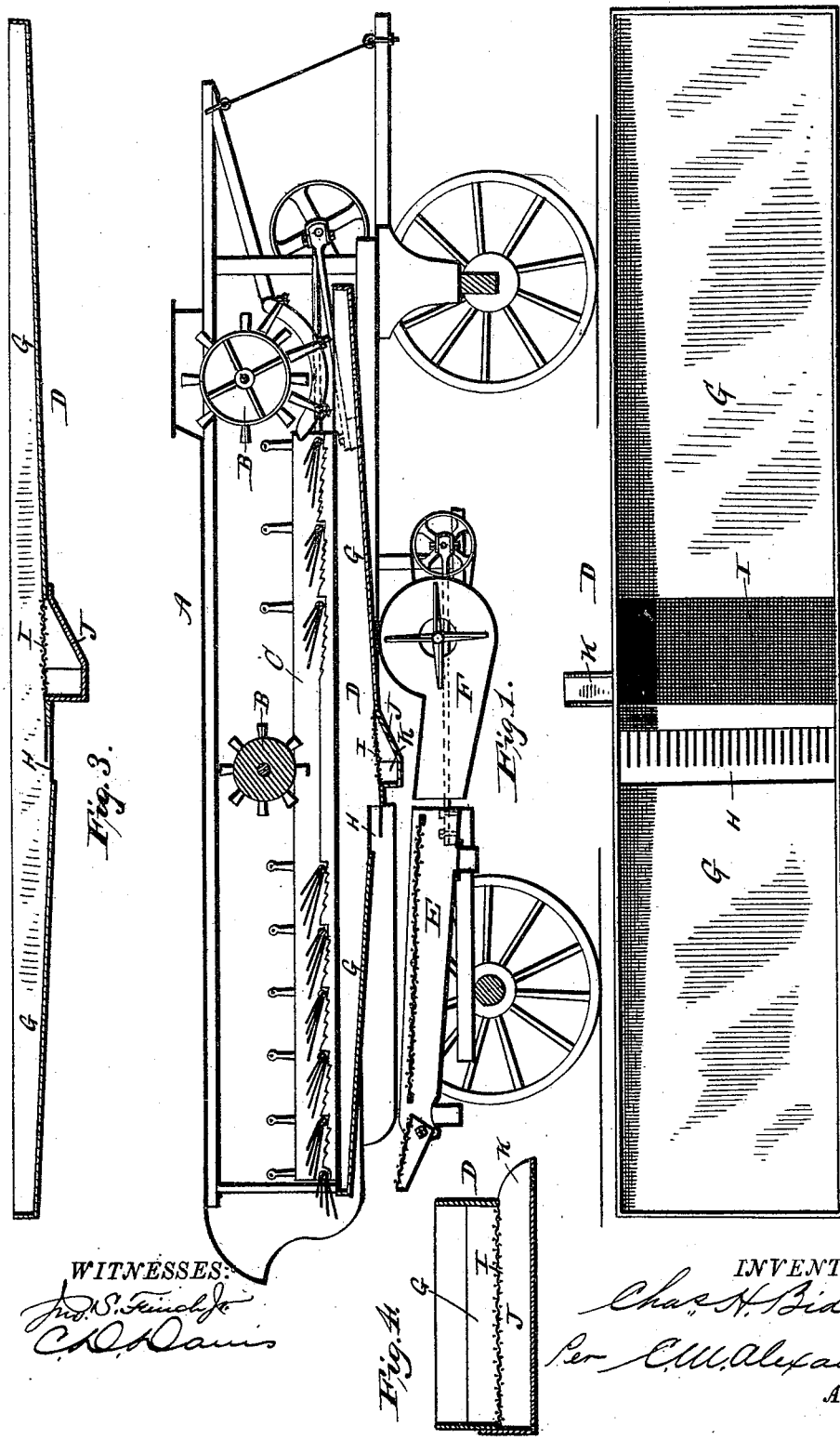
WITNESSES:
INVENTOR:
Chas. H. Bidwell
Per C. M. Alexander
Attorney

UNITED STATES PATENT OFFICE.

CHARLES H. BIDWELL, OF ALBION, NEW YORK.

BEAN-THRASHING MACHINE.

SPECIFICATION forming part of Letters Patent No. 402,893, dated May 7, 1889.

Application filed February 6, 1886. Serial No. 191,067. (No model.)

*To all whom it may concern:*

Be it known that I, CHARLES H. BIDWELL, a citizen of the United States, residing at Albion, in the county of Orleans and State of New York, have invented certain new and useful Improvements in Bean-Thrashing Machines, of which the following is a full, clear, and exact description, reference being had to the drawings hereto annexed and forming a part of this specification.

In the accompanying drawings, Figure 1 represents a longitudinal vertical sectional view of a bean-thrashing machine provided with my improvement; Fig. 2, an enlarged detail plan view of the conveyer-pan; Fig. 3, an enlarged longitudinal sectional elevation of the conveyer-pan of the thrasher detached; and Fig. 4, a transverse sectional view of the same, taken through the screen and spout.

The invention relates to certain improvements upon bean-thrashing machines, the nature and object of which are fully hereinafter set forth.

Referring to the accompanying drawings, which form a part of this specification, the letter A designates a bean-thrashing machine of the ordinary construction; B B, the thrashing-cylinders thereof; C, the upper vibrating conveyer adapted to force the vines through machines while the beans are being separated therefrom; D, the lower conveyer-pan arranged beneath the above-mentioned conveyer and adapted to collect the thrashed beans, loose dirt, shells, &c.

E designates the shaking-screen which separates the chaff from the beans, and F the fan-blower arranged immediately in front of the shaking-screen and adapted to force a blast of air through the same for the purpose of finally cleaning the thrashed beans.

All of the parts of the machine are of the usual and well-known construction except the conveyer-pan D.

The bottom of the conveyer-pan D consists of two portions, G G, which incline downwardly from the ends of the pan to a point about midway the length of the same. At the point about where the two inclined portions G G meet the bottom of the pan is provided with a transverse opening, H, through which the thrashed beans fall upon the shaking-screen, which is arranged immediately below. A short distance in front of the opening H the bottom of the pan is provided with another transverse opening, over which is stretched a wire or other screen, I, of suitable mesh, this screen being so arranged, as is evident, that the thrashed beans will have to pass over it before they fall into the said opening H in the bottom of the pan. Directly beneath this screen, attached to the pan, is arranged a receptacle or pan, J, which is provided with an inclined bottom and a spout, K, this spout extending out beyond one side of the pan, whereby the dirt and dust separated from the beans as they pass over the screen will be collected and conveyed to one side of the machine out of the way.

It will be evident that the thrashed beans, chaff, and dust from the vines as they pass through the machine will all fall upon the conveyer-pan, the vines (fodder) passing out at the end of the machine, as usual. The conveyer-pan being agitated in the usual manner, the beans, &c., will pass down the inclined portions of the bottom toward the opening H. As the beans, chaff, dust, &c., that have fallen upon the forward inclined portion of the bottom (where most, if not all, of the dust, dirt, &c., usually falls) travel toward the opening H in the bottom of the pan, they pass over the sieve or screen I, which separates the dust, dirt, foul seeds, &c., from the good beans, the receptacle beneath collecting the separated dust, &c., and conveying it to one side of the machine out of the way. By this means it will be observed most of the dust and dirt is separated from the beans before they are delivered to the shaking-screen to be subjected to the blast from the fan-blower. The object in thus separating the dust and dirt from the beans before they are delivered to the screen is to prevent the dust from being blown out of the machine by the action of the fan-blower and scattered about over the machine and workmen and into the fodder, decreasing the value of the latter.

Having thus fully described my invention, what I claim as new, and desire to secure by Letters Patent, is—

The combination, with the conveyer-pan having a transverse opening, H, in its bottom, the portions of the bottom on each side of this opening converging toward the same, of a screen stretched over an opening in the bottom of the pan, in front of the said opening H, and a receptacle attached to the conveyer-pan beneath the said screen, substantially as described.

CHAS. H. BIDWELL.

Witnesses:
WILLIAM T. MILLER,
E. M. TOUSLEY.